United States Patent [19]

Bell et al.

[11] Patent Number: 4,864,968

[45] Date of Patent: Sep. 12, 1989

[54] YOKING APPARATUS

[76] Inventors: Stewart M. Bell, 1 Southleaze Farm, Swindon, Wiltshire, SN1 2NT; Timothy E. Dibble, Cowslip Farm,, Wickwar, Gloucestershire, both of England

[21] Appl. No.: 122,439

[22] Filed: Nov. 19, 1987

[51] Int. Cl.[4] ............................................... A01K 1/00
[52] U.S. Cl. .................................................. 119/147.1
[58] Field of Search ............................ 119/147 R, 148

[56] References Cited

U.S. PATENT DOCUMENTS

| | | | |
|---|---|---|---|
| 889,045 | 5/1908 | Rodden et al. | 119/148 |
| 1,020,710 | 3/1912 | Rau | 119/167 |

Primary Examiner—Robert Peshock

[57] ABSTRACT

Yoking apparatus primarily intended for use in the milking of sheep has an upright framework mounted on a milking platform and defining a series of yoke openings in which ewes are held by their necks. Associated with each opening is a respective yoke lever mounted on the back of the framework. Each yoke lever is pivotable about its mid-point between a closed position in which it traps the ewe in the associated opening and a release position in which the top of the opening is clear. A number of pivotable shields are linked by chains to respective yoke levers to cover the openings when the levers are in their release positions. A locking mechanism positively latches the levers in their closed positions. The arrangement of linked yoking levers and shields permits cascaded yoking of ewes largely without unwanted trapping of the ewes in the yoke openings and with minimal fouling of the mechanism by wool.

12 Claims, 3 Drawing Sheets

YOKING APPARATUS

BACKGROUND OF THE INVENTION

This invention relates to yoking apparatus for use in animal milking, particularly the milking of sheep.

It is known to equip a sheep milking parlour with yoking apparatus comprising a framework defining a number of yoke openings, arranged side by side in a row, in which the ewes are held by their necks while being milked. The openings are normally open to the top so that the ewes may enter from above to reach a food hopper or buckets on the far side of the framework from the milking apparatus. Yoking levers pivotally mounted adjacent each openng can be swung down from an inoperative position to an operative closed position over the ewes' necks and then locked so as to trap the ewes until milking is complete. In the known system each yoking lever is shaped to engage the yoking lever of the neighbouring opening to one side when both levers are in the inoperative position. This has the effect of leaving only one opening at a time open for the ewe to enter. Entry of the ewe into that opening causes the lever associated with that opening to swing down to the operative position, freeing the lever associated with the next opening ready for the next ewe. Such an arrangement of interlocking yoking levers is commonly referred to as a cascade system and assists in bringing ewes in an orderly manner into the milking parlour and into the yoke openings without obstructing each other.

Difficulties with such an arrangement include the need to construct the yoke levers and mount them sufficiently accurately that each engages with its neighbour for satisfactory cascaded interlocking operation. An arrangement which operates correctly when new may not do so after heavy use due to wear in pivot bearings and engaging surfaces. A further disadvantage is that the engaging surfaces of the yoking levers are, in the known apparatus, necessarily situated in the region of the yoke openings where they can harm the ewes due to their sharp edges and where they can become dirty and fouled with wool. The locking mechanism is also in the region of the openings and can fail as a result of wool becoming trapped. Indeed, it is possible for the movement of a ewe with wool trapped in the locking mechanism to release the lock during milking. Yet another disadvantage is the tendency for the rotation of a yoke lever towards its inoperative position when the ewes are released after milking to happen so quickly that the portion which engages the neighbouring lever strikes the ewe in the neighbouring opening if she has not already withdrawn from the opening.

SUMMARY OF THE INVENTION

According to this invention, there is provided an improved yoking apparatus for the milking of animals comprising: a framework defining a plurality of yoke openings; a plurality of yoke levers each mounted on the framework adjacent a respective one of said openings and each movable between a release position for allowing the animal to enter or withdraw from said opening and a closed position in which the animal is retained in the opening; and a plurality of shields each mounted on the framework for movement between a closed position in which the shield covers, at least in part, a respective one of said yoke openings to prevent entry into the opening when the yoke lever associated with the same opening is in its release position, and an open position in which the shield is largely clear of said opening. In a preferred embodiment of the invention both the yoke levers and the shields are pivotally mounted on the framework, each shield being connected to the yoke lever associated with a neighbouring one of the openings to allow the shield to pivot between its open and closed positions when the yoke lever is in its release position but retaining the shield in its open position when the yoke lever is in its closed position. Each shield must be mounted on a pivot located on the framework between the opening it covers and the neighbouring opening, with its centre of gravity on the same side of the pivot as the opening with which the shield is associated for all positions of the shield so that the shield is biased by the force of gravity to its closed position.

The preferred embodiment includes releasable locking means for automatically locking the yoke levers when they are moved from their release to their closed positions, these locking means comprising pivotable locking members for engaging latch portions on the yoke levers. Preferably, both the locking members and the yoke levers are mounted on the framework such that they are shielded from milking side of the framework.

Apparatus having the features described above allows cascaded yoking of the animals without the problem encountered with the prior art system of ewes being trapped by the yoke levers when they should be released. The shields prevent access to openings having yoke levers in the release position until the yoke lever of the preceding opening is pushed into the closed position by a ewe entering that opening. Mounting the yoke levers and the locking members in locations shielded fron the milking side of the framework, e.g. by mounting them on pivots on the feeding side, largely overcomes the problems of ewes' wool becoming trapped in the mechanism. Since it is not necessary to construct the yoke levers as interlocking members to achieve cascaded operation, the need for accurate shaping and mounting of the yoke levers is avoided and problems associated with wear of the mechanism are much reduced.

The invention will be described below by way of example with reference to the drawings.

DETAILED DESCRIPTION OF THE PREFERRED EMBODIMENT OF THE INVENTION

Figure 1:
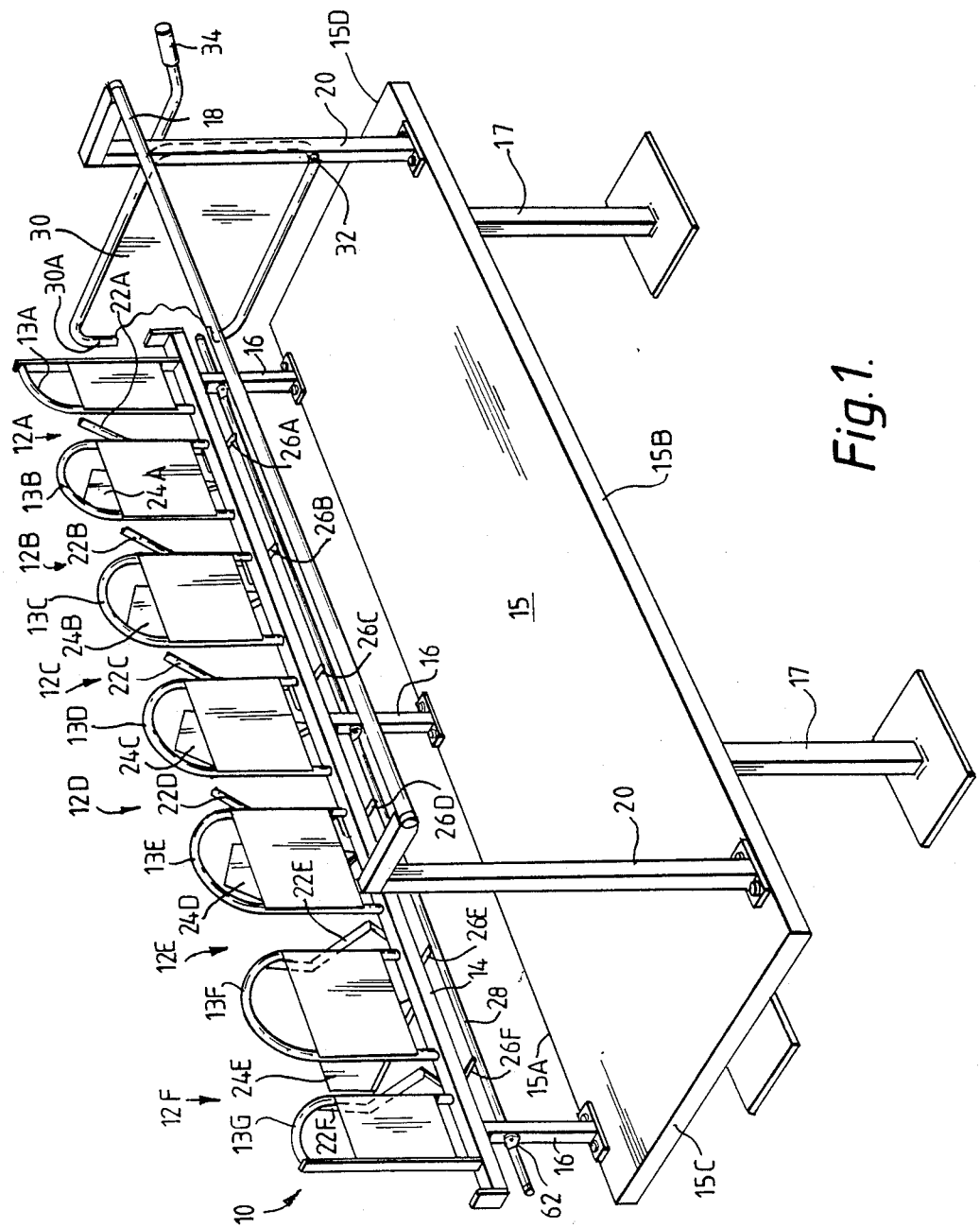
FIG. 1 is a simplified perspective view of yoking apparatus in accordance with the invention looking from the front and above, including a framework having a number of yoke openings.

Referring to FIG. 1, yoking apparatus in accordance with the invention for milking sheep has an elongate framework 10 defining six yoke openings 12A to 12F between "tombstones" 13A to 13G where ewes are held by the neck during milking. The tombstones extend upwardly from an elongate lower bar 14. The framework 10 is mounted on one edge 15A of a platform 15 by posts 16, the platform extending over the full length of the apparatus and being supported on legs 17 so that ewes standing on the platform 15 are at a convenient height for milking. To support the milking apparatus (not shown), an elongate bar 18 is mounted over the front edge 15B of the platform by a pair of posts 20.

The framework 10 supports six pivotable yoke levers 22A to 22F associated with respective openings 12A to 12F and five shields 24A to 24E connected respectively to yoke levers 22A to 22E by flexible means such as a wire, cord or chain (not shown in FIG. 1). A locking mechanism comprising a plurality of locking members 26A to 26F pivotally secured to the lower bar 14 of the framework 10 and operable by a resiliently mounted trip bar 28 locks the yoke levers in a closed position as will be described hereinafter. The yoke levers and the locking mechanism are mounted on the rear side of the framework 10 so as to be shielded from the platform 15.

Ewes reach the platform 15 by an entry ramp or other raised structure (not shown in the drawings) adjacent the entry edge 15C of the platform, and leave via an exit ramp or other structure adjacent platform exit edge 15D providing exit gate 30 is raised from its illustrated closed position by movement about its pivot mounting 32 on one of the posts 20. (In FIG. 1, the distal edge 30A of the gate 30 is cut away to show the ends of the framework lower bar 14 and the locking bar 28.) The exit gate 30 is coupled to the trip bar 28 in a manner to be described below with reference to FIG. 4.

If required, an entry gate similar to the exit gate may be mounted on the post 20 at the left hand end of the platform 15 (the entry end) as seen in FIG. 1.

A feeding trough or feed buckets (not shown) are placed on the far side of the framework 10 at a suitable height to enable the ewes to feed when they bring their necks down into the lower parts of the openings 12A to 12F.

Before describing further details of the yoking mechanism, a brief explanation of its operation with reference to FIG. 1 is appropriate. In FIG. 1 the first four yoke levers 12A to 12D are shown in their closed positions which means in practice that four ewes are held in the openings 12A to 12D. The remaining two levers 22E and 22F are shown in their release positions which means that openings 12E and 12F are not yet occupied. The five shields 24A to 24E are associated respectively with openings 12B to 12F and are so connected to yoke levers 22A to 22E that when the yoke levers are in their release positions the shields are free to pivot between open positions in which they are clear of their associated openings and closed positions in which they cover the major parts of the openings, although they are urged towards the closed positions under their own weight.

When the yoke levers are in their closed positions, the shields are held up in their open positions. Thus with the yoke levers in the positions shown in FIG. 1, shields 24A to 24D are in their raised, open positions, while shield 24E is in its closed position, covering opening 12F. It will be seen that this results in only one opening being clear at any time prior to all six openings being occupied.

Initially, all six yoke levers 22A to 22F are in their release positions and all five shields 24A to 24E are closed, leaving only opening 12A (which has no associated shield) clear. The exit gate is closed and the entry gate (not shown) is open. Six ewes are allowed to walk into the platform 15. The first ewe enters opening 12A to reach the feed behind the framework 10 and in so doing moves lever 22A to its closed position in which it is then automatically locked to trap the ewe. The movement of yoke lever 22A raises the shield 24A to its open position, thereby clearing the second opening 12B to allow entry of a second ewe. This in turn causes lever 22B to be moved so clearing the third opening 12C. In this way, a cascaded operation in which each opening is cleared in turn is performed until all six ewes are trapped in an opening and milking can begin. At this point the entry gate, if fitted, is closed.

On completion of milking, the exit gate 30 is opened by means of handle 34 which actuates the locking mechanism to release all six yoke levers 22A to 22F, whereupon the levers begin to move towards their release positions. The ewes are now free to lift their necks out of the openings. The shields begin to pivot towards their closed positions, but are free to move upwards when the ewes in openings 12B to 12F raise their necks. Once freed, the ewes are driven past the exit gate 30.

Figure 2:
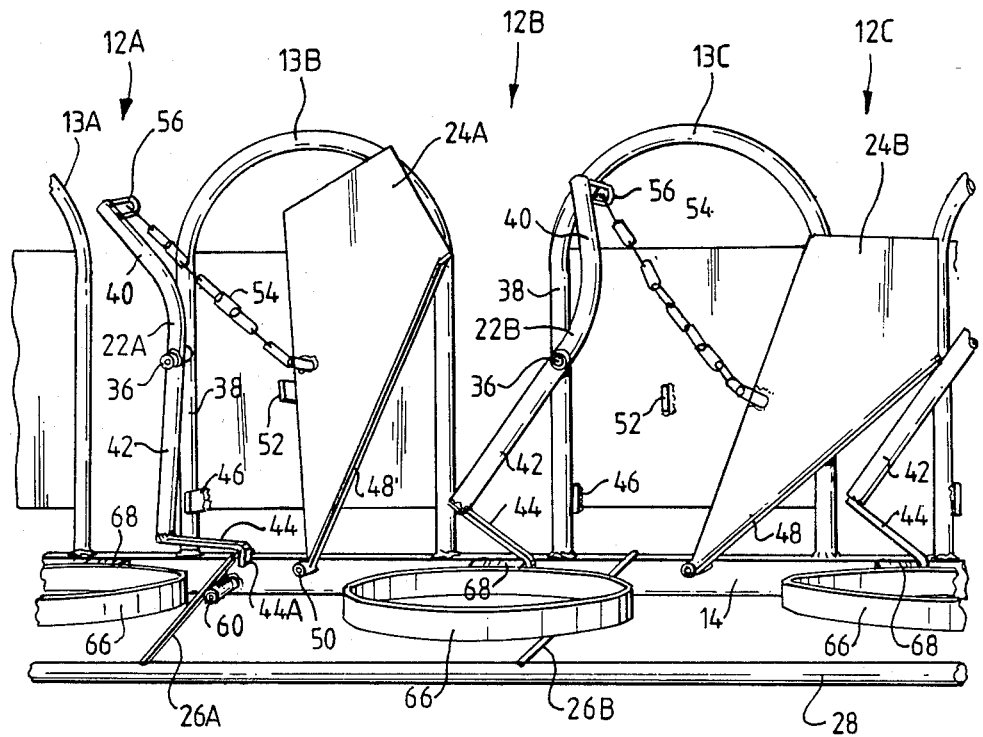
FIG. 2 is a rear view of part of the framework at the exit end of the apparatus.

Referring now to FIG. 2, each yoke lever 22A to 22F is mounted on a pivot pin 36 welded to one edge 38 of the tombstone adjacent its respective opening. The lever has an upper arm 40 for trapping the ewe when it is in its closed position and a lower arm 42 extending downwardly from the pivot pin 36 to a laterally extending latch portion 44 with a latch bar 44A. The upper arm 40 is angled with respect to the lower arm 42 in a direction such that the upper arm 40 extends over the opening when the lever is in its closed position and the lower arm 42 is vertical, and such that in the open position of the lever the upper arm 40 is clear of the opening and the lower arm extends at an angle across the lower part of the opening so that it can be pushed aside by the ewe's neck. A stop 46 limits movement of the yoking lever.

Figure 3:
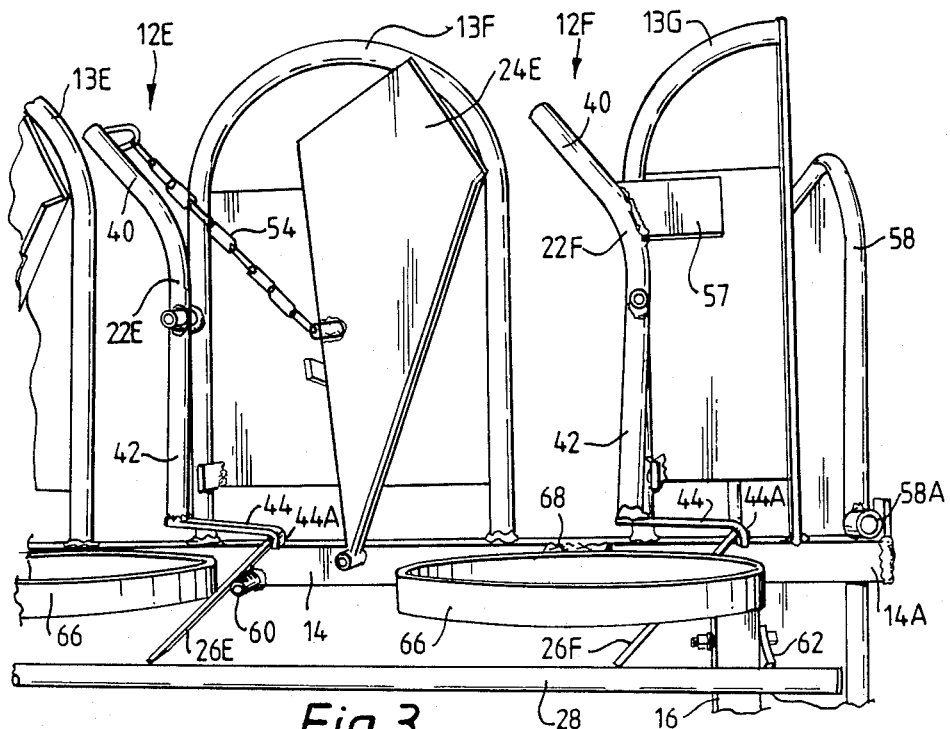
FIG. 3 is a similar rear view of part of the framework showing the entry end of the apparatus.

Still referring to FIG. 2, each shield 24A to 24E is manufactured from sheet metal, is of kite shape and has a flanged lower edge 48. The shield is pivoted on a pin 50 projecting rearwardly from the lower bar 14 of the framework, the pin being located midway between the openings on either side to enable the framework 10 to be manufactured easily on either a left-hand cascading system, as shown, or a right-hand system. Of the two shields shown in FIG. 2, shield 24A is in its open position against a shield stop 52 and shield 24B is in its closed position covering that part of the opening 12C above the associated yoke lever. Since the centre of gravity of each shield is alwyas on the same side of its pivot pin 50 as the opening it covers, it is always biased towards its closed position. Connection means in the form of a chain 54 flexibly couples each shield to the upper arm 40 of the yoke lever of the preceding opening, the length of the chain 54 and its location on the arm 40 and the shield being chosen to give the required range of movement of the shield. It will be appreciated that with the chain 54 coupled to a loop 56 at the top end of the yoke lever, the turning moment which needs to be exerted by the ewe on the lower arm 42 of the lever to raise the shield diminishes as the lever approaches its closed position, thereby assisting in achieving positive movement of the lever towards the closed position. Since there is no shield connected to the last yoke lever, lever 22F, a biasing weight 57 is welded to the upper arm 40 of that lever, as shown in FIG. 3, to bias it towards the closed position. Also visible in FIG. 3 is an optional entry gate 58 having a stub portion 58A which rests on an end position 14A of the lower framework bar 14 when the gate is closed.

Considering the locking mechanism and referring again to FIG. 2, each of the locking members 26A to 26F is mounted on the rear surface of the lower framework bar 14 by a pivot pin 60 (only the pin of member 26A is visible in FIG. 2). The locking member comprises a metal strip welded to a sleeve encircling the pin 60 in a position which results in a longer portion of the strip extending to one side of the pin than to the other side so that the locking member is biased for movement in an anti-clockwise direction as seen from the rear of the framework. Consequently, when the associated yoke lever reaches its closed position the latch finger 44A latches over the locking member, the upper end of which seats behind the finger 44A as shown. The included angle between the finger 44A and the locking member is less than 90 degrees so that attempts by the ewe to raise her neck against the upper arm 40 of the yoke lever serve merely to lock the lever more securely. The trip bar 28 is located immediately beneath the lower ends of the locking members, and it is only upon raising of this bar by opening the exit gate 30 (see FIG. 1) that the latch portions of the yoke levers be released and the levers themselves can swing back to their release positions.

Figure 4:
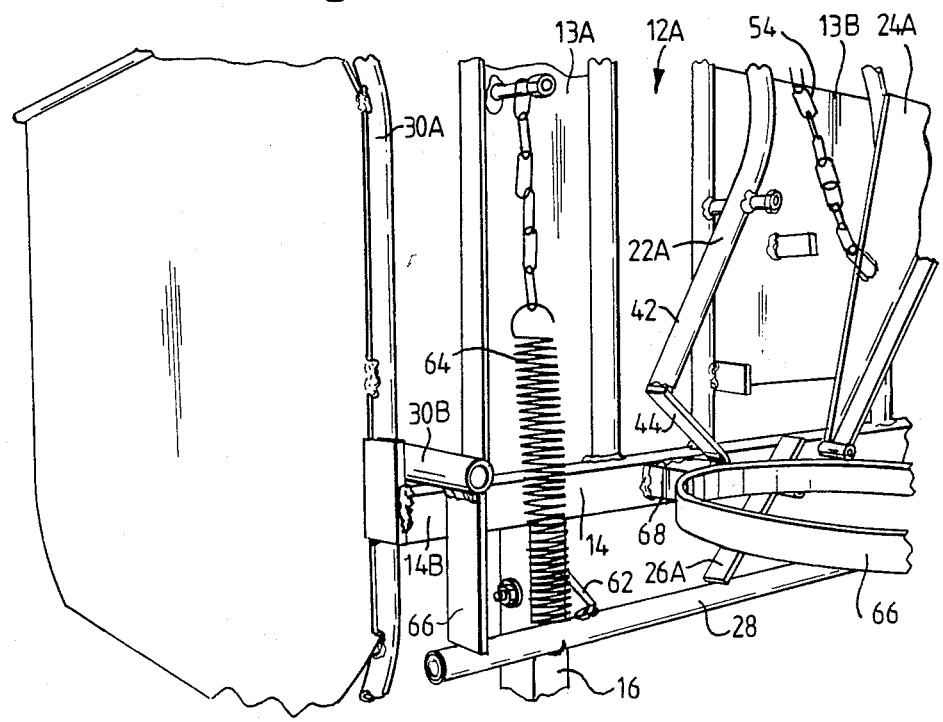
FIG. 4 is a fragmented perspective view of the exit end of the apparatus looking from the rear and one side and showing an exit gate and a locking mechanism.

The trip bar mechanism is clearly visible in FIGS. 3 and 4. The trip bar 28 extends the length of the apparatus and is mounted on the posts 16 supporting the framework 10 (FIG. 1) by three rearwardly projecting swivel arms 62. A spring 64, shown in FIG. 4 applies an upward force to the trip bar 28 but upward movement of the latter is prevented when the exit gate 30 is closed by a push member 66 welded to a stub portion 30B of the exit gate 30, the weight of the gate 30 being sufficient to overcome the force of the spring 64. Stub portion 30B also rests on the end portion 14B of the framework lower bar 14 when the exit gate 30 is closed. Raising the gate 30 to its open position allows the spring 64 to lift the trip bar 28 which then trips the locking members 26A to 26F.

Finally, a feature of the apparatus not shown in FIG. 1 but visible in FIGS. 2 to 4 is a plurality of bucket rings 66 for holding feed buckets behind each yoke opening. It will be noted that the bucket ring supports 68 on the lower framework bar 14 act as stops for the latch portions 44 of the yoke levers 22A to prevent rotation beyond their release positions.

What is claimed is:

1. Yoking apparatus for use in the milking of animals comprising;
    a framework defining a plurality of yoke openings;
    a plurality of yoke levers each mounted on the framework adjacent a respective one of said openings and each movable between a release position for allowing the animal to enter or withdraw from said opening and a closed position in which the animal is retained in the opening; and
    a plurality of shields each mounted on the framework for movement between a closed position in which the shield covers, at least in part, a respective one of said yoke openings to prevent entry into the opening when the yoke lever associated with the same opening is in its release position, andan open position in which the shield is largely clear of said opening.

2. Apparatus according to claim 1, further comprising means connecting each shield to the yoke lever associated with a neighbouring one of said openings, the connecting means allowing the shield to move between its open and closed positions when said yoke lever is in its release position but retaining the shield in its open position when said yoke lever is in its closed position.

3. Apparatus according to claim 1, wherein each shield is mounted on a pivot located on the framework between the opening it covers and the neighbouring opening.

4. Apparatus according to claim 2, wherein said shield is arranged so as to be urged towards its closed position when said yoke lever associated with said neighbouring opening is in its release position.

5. Apparatus according to claim 4, wherein said shield is mounted on a pivot located on the framework between the opening with which said shield is associated and the neighbouring opening, and is so constructed that its centre of gravity is on the same side of the pivot as the opening with which the shield is associated thereby to urge the shield towards its closed position.

6. Apparatus according to claim 1, wherein the shield is in the form of a plate which, in its closed position, extends over the major part of the area of the opening with which it is associated.

7. Apparatus according to claim 1, further comprising releasable locking means operable to lock the yoke levers automatically when they are moved from their open positions to their enclosed positions.

8. Yoking apparatus for use in the milking of animals comprising:
    a framework defining a plurality of yoke openings for holding animals during milking, the framework having a feeding side and a milking side;
    a plurality of yoke levers each mounted on the framework such that at least part of the framework shields the yoke levers from the milking side, each lever being mounted adjacent a respective one of said openings and movable between a release position for allowing an animal to enter or withdraw from said respective opening and a closed position in which the animal is retained in said opening; and
    releasable locking means operable to lock the yoke levers in their closed positions, said locking means being mounted on the framework such that at least part of the framework shields the locking means from the milking side,
said apparatus further comprising a plurality of shields each mounted on said framework adjacent a respective one of said openings for movement between a closed position in which the shield covers, at least in part, a respective one of said openings, and an open position in which the shield is largely clear of said opening.

9. Yoking apparatus for use in the milking of animals comprising:
    a framework defining a plurality of yoke openings;
    a plurality of yoke levers each mounted on the framework adjacent and to one side a respective one of said openings and each movable between a release position for allowing the animal to enter and withdraw from the opening and a closed position in which the animal is retained in the opening; and
    a plurality of locking members each pivotably mounted on the framework adjacent a respective one of said openings and biased for rotation in a first direction about a respective pivot axis;
    each yoke lever having a latch portion for engaging one of said locking members when the lever is in its closed position, the arrangement of the latch portion and the respective locking member being such that on movement of the lever to its closed position the latch member firstly moves the locking member against its biased direction of rotation and then allows the member to rotate in the biased direction to a locking position thereby to lock the lever in its closed position;

wherein the apparatus further comprises a release device operable to move the locking members against their biased direction of rotation from their locking positions so as to release the latch portion of the yoking levers and to allow the levers to move from their closed positions to their release positions.

10. Apparatus according to claim 9, wherein each locking member comprises a lever arm having one end positioned to engage the latch portion of a respective yoking lever and another end for engagement with the release device, the lever arm having a mounting pivot which is nearer said one end than said other end whereby, in use of the apparatus, gravitational force biases the arm in said biased direction of rotation about said pivot.

11. Apparatus according the claim 9, wherein said release device comprises a resiliently mounted bar located lengthwise with respect to the framework so as to be movable towards engagement with every said locking member simultaneously.

12. Yoking apparatus for use in the milking of animals comprising:

an elongate framework having a first end and a second end and defining a plurality of yoke openings which are normally upwardly open;

a plurality of yoke levers, one for each opening, each pivotally mounted on the framework by a pivot at the side of the respective opening for movement between a release position in which the respective opening is open to the top and a closed position in which an upper part of said opening is closed off;

a plurality of shields each pivotally mounted on the framework for movement between a closed position in which each shield covers, at least in part, a respective one of said openings and an open position in which the shield is largely clear of said opening, and each biased towards the closed position;

means connecting each shield to the yoke lever associated with the neighbouring opening in the direction of the first end of the framework and arranged such that in the release position of said yoke lever the shield is pivotable between its open and closed positions and such that in the closed position of said yoke lever the shield is held in its open position, whereby movement of each yoke lever from its release position to its closed position moves the shield of a subsequent opening from its closed position to the open position to allow access to that subsequent opening; and a plurality of latches for locking each yoke lever in its closed position.

* * * * *